US012600547B2

(12) United States Patent
Li

(10) Patent No.: US 12,600,547 B2
(45) Date of Patent: Apr. 14, 2026

(54) MOUTHFUL PACKAGED RAW LIQUOR AND ASSEMBLY, AND PERSONALIZED PRE-ORDERING METHOD BASED ON LIQUOR TASTING HABITS

(71) Applicant: Zhejiang Geely Holding Group Co., Ltd., Hangzhou (CN)

(72) Inventor: Shufu Li, Hangzhou (CN)

(73) Assignee: ZHEJIANG GEELY HOLDING GROUP CO., LTD., Hangzhou (CN)

( * ) Notice: Subject to any disclaimer, the term of this patent is extended or adjusted under 35 U.S.C. 154(b) by 255 days.

(21) Appl. No.: 18/552,446

(22) PCT Filed: May 25, 2022

(86) PCT No.: PCT/CN2022/094944
§ 371 (c)(1),
(2) Date: Sep. 26, 2023

(87) PCT Pub. No.: WO2023/000809
PCT Pub. Date: Jan. 26, 2023

(65) Prior Publication Data
US 2024/0174421 A1 May 30, 2024

(30) Foreign Application Priority Data
Jul. 20, 2021 (CN) .......................... 202110817664.7

(51) Int. Cl.
*B65D 77/04* (2006.01)
*B65B 21/02* (2006.01)
(Continued)

(52) U.S. Cl.
CPC .......... *B65D 77/0426* (2013.01); *B65B 21/02* (2013.01); *B65D 5/66* (2013.01);
(Continued)

(58) Field of Classification Search
CPC ...... B65D 77/0426; B65D 5/66; B65D 23/14; B65D 41/04; B65D 85/72;
(Continued)

(56) References Cited

U.S. PATENT DOCUMENTS 5,289,650 A * 3/1994 Follett ...................... G09F 3/04
40/310
9,248,939 B2 * 2/2016 O'Brien ............... B29D 22/003
(Continued)

FOREIGN PATENT DOCUMENTS

CN 2815934 Y 9/2006
CN 201080338 Y 7/2008
(Continued)

OTHER PUBLICATIONS

International Search Report of PCT Patent Application No. PCT/CN2022/094944 issued on Jul. 28, 2022.
(Continued)

*Primary Examiner* — Dariush Seif
(74) *Attorney, Agent, or Firm* — Andrew C. Cheng

(57) ABSTRACT

A one-shot packaged unblended liquor and assembly, and a personalized pre-ordering method based on liquor tasting habits. The one-shot packaged unblended liquor comprises a liquor bottle. The volume of the liquor bottle is 10-50 ml, and unblended liquor is packaged in the liquor bottle. The unblended liquor is made by subjecting liquor-brewing raw materials to fermentation and distillation in a specific fermentation pit, without being blended or a liquor mixing process. The one-shot packaged unblended liquor assembly comprises a packaging box, the one-shot packaged unblended liquor being provided in the packaging box. The personalized pre-ordering method based on liquor tasting habits is used for pre-ordering the one-shot packaged unblended liquor assembly.

19 Claims, 4 Drawing Sheets

(51) Int. Cl.

| | |
|---|---|
| *B65D 5/66* | (2006.01) |
| *B65D 23/14* | (2006.01) |
| *B65D 41/04* | (2006.01) |
| *B65D 85/72* | (2006.01) |
| *B67C 3/00* | (2006.01) |
| *C12G 3/00* | (2019.01) |
| *G06Q 30/0601* | (2023.01) |

(52) U.S. Cl.

CPC ............. *B65D 23/14* (2013.01); *B65D 41/04* (2013.01); *B65D 85/72* (2013.01); *B67C 3/007* (2013.01); *C12G 3/00* (2013.01); *G06Q 30/0633* (2013.01); *B65D 2577/042* (2013.01)

(58) Field of Classification Search

CPC ... B65D 2577/042; B65B 21/02; B67C 3/007; C12G 3/00; G06Q 30/0633

See application file for complete search history.

(56) References Cited

U.S. PATENT DOCUMENTS

| | | | | |
|---|---|---|---|---|
| 9,624,001 | B1* | 4/2017 | Hill | B65D 23/065 |
| 10,996,207 | B1* | 5/2021 | Taheri | B65D 85/72 |
| 2003/0111375 | A1* | 6/2003 | Kilmartin | B65D 23/0871 |
| | | | | 206/459.5 |
| 2004/0149624 | A1* | 8/2004 | Wischusen | B65D 5/5425 |
| | | | | 206/427 |
| 2005/0018305 | A1* | 1/2005 | Raymond | B44F 1/06 |
| | | | | 359/618 |
| 2007/0214055 | A1* | 9/2007 | Temko | G06Q 20/203 |
| | | | | 705/22 |
| 2008/0019029 | A1* | 1/2008 | Raymond | G02B 27/10 |
| | | | | 53/442 |
| 2008/0201094 | A1* | 8/2008 | Vogt | G06Q 10/087 |
| | | | | 705/28 |
| 2008/0319876 | A1* | 12/2008 | Goldburt | G06Q 30/0601 |
| | | | | 705/26.1 |
| 2009/0026167 | A1* | 1/2009 | Metry | G09F 3/0288 |
| | | | | 215/386 |
| 2009/0315315 | A1* | 12/2009 | Bolouri | G09F 23/06 |
| | | | | 283/56 |

| | | | | |
|---|---|---|---|---|
| 2010/0294770 | A1* | 11/2010 | Wing | B65D 17/462 |
| | | | | 220/270 |
| 2012/0298544 | A1* | 11/2012 | Capdevila Pons | G09F 3/0289 |
| | | | | 206/459.5 |
| 2013/0279832 | A1* | 10/2013 | Burri | B65D 75/5811 |
| | | | | 493/264 |
| 2016/0009468 | A1* | 1/2016 | Rancien | B67B 5/036 |
| | | | | 53/410 |
| 2017/0020783 | A1* | 1/2017 | Shani | B65D 77/0493 |
| 2019/0008296 | A1* | 1/2019 | Suprina | B65D 1/02 |
| 2019/0127114 | A1* | 5/2019 | Livesley-James | |
| | | | | B65D 77/2024 |
| 2019/0193891 | A1* | 6/2019 | Livesley-James | B65D 17/02 |
| 2019/0236531 | A1* | 8/2019 | Adato | G06Q 10/087 |
| 2019/0244501 | A1* | 8/2019 | Favier | G09F 3/10 |
| 2020/0012914 | A1* | 1/2020 | Mongrenier | G06K 19/07722 |
| 2020/0080037 | A1* | 3/2020 | Wilkie | B65C 3/08 |
| 2021/0035474 | A1* | 2/2021 | Bartlein | B65D 23/14 |
| 2021/0316933 | A1* | 10/2021 | Lezama Villagomez | |
| | | | | A47G 19/22 |
| 2023/0122432 | A1* | 4/2023 | Morgan | B65D 81/264 |
| | | | | 206/204 |
| 2024/0174421 | A1* | 5/2024 | Li | B65B 21/02 |

FOREIGN PATENT DOCUMENTS

| | | |
|---|---|---|
| CN | 201309644 Y | 9/2009 |
| CN | 201325671 Y | 10/2009 |
| CN | 201864225 U | 6/2011 |
| CN | 103903150 A | 7/2014 |
| CN | 104899765 A | 9/2015 |
| CN | 107533722 A | 1/2018 |
| CN | 110163698 A | 8/2019 |
| CN | 113650965 A | 11/2021 |
| CN | 113697230 A | 11/2021 |
| CN | 215972571 A | 3/2022 |
| CN | 216187332 U | 4/2022 |

OTHER PUBLICATIONS

Search report of CN Patent Application No. 202110817664.7 issued on May 7, 2022.

* cited by examiner

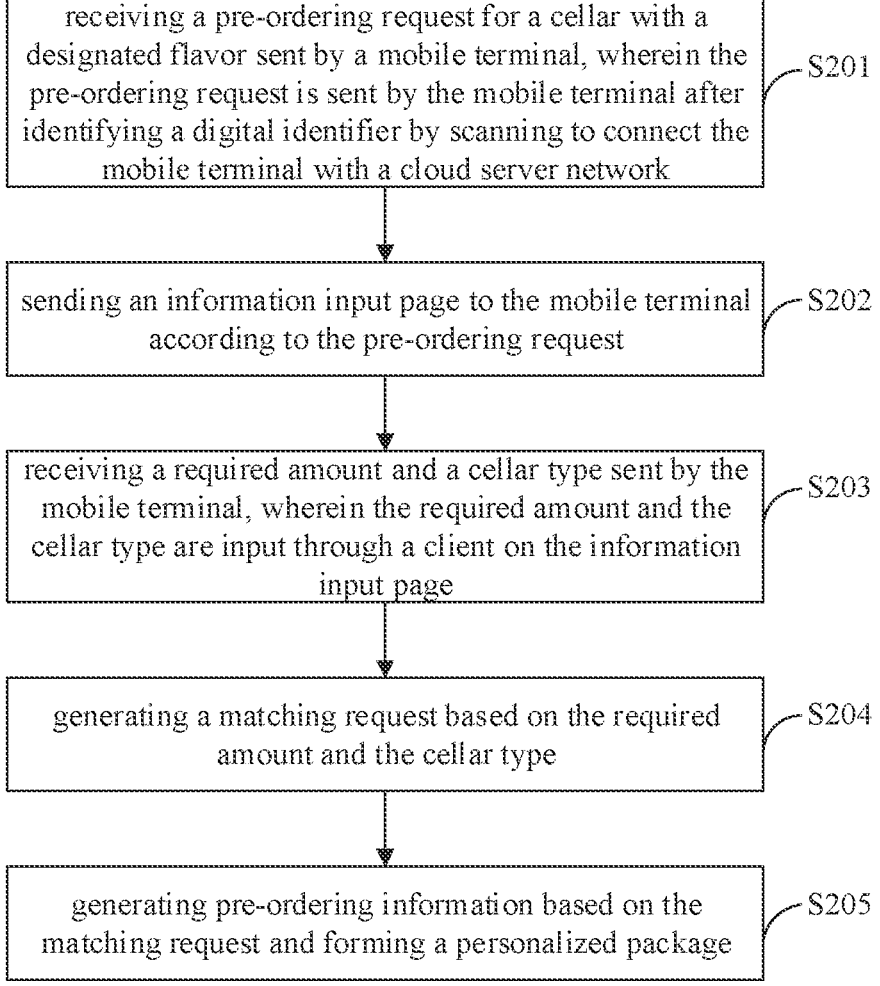

receiving a pre-ordering request for a cellar with a
designated flavor sent by a mobile terminal, wherein the
pre-ordering request is sent by the mobile terminal after
identifying a digital identifier by scanning to connect the
mobile terminal with a cloud server network ⟶ S201 sending an information input page to the mobile terminal
according to the pre-ordering request ⟶ S202 receiving a required amount and a cellar type sent by the
mobile terminal, wherein the required amount and the
cellar type are input through a client on the information
input page ⟶ S203 generating a matching request based on the required
amount and the cellar type ⟶ S204 generating pre-ordering information based on the
matching request and forming a personalized package ⟶ S205

FIG. 3

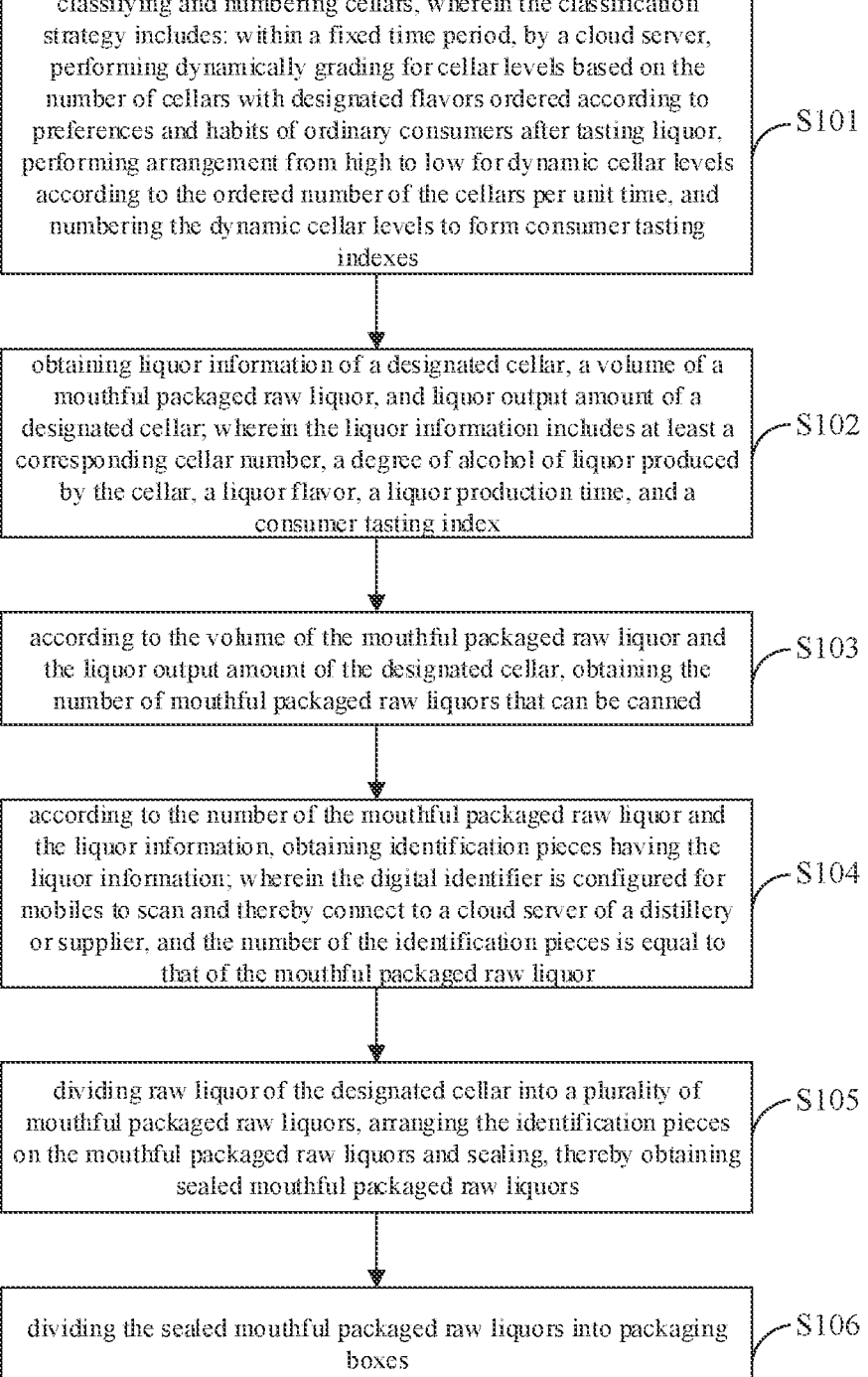

classifying and numbering cellars, wherein the classification strategy includes: within a fixed time period, by a cloud server, performing dynamically grading for cellar levels based on the number of cellars with designated flavors ordered according to preferences and habits of ordinary consumers after tasting liquor, performing arrangement from high to low for dynamic cellar levels according to the ordered number of the cellars per unit time, and numbering the dynamic cellar levels to form consumer tasting indexes ⟋S101 obtaining liquor information of a designated cellar, a volume of a mouthful packaged raw liquor, and liquor output amount of a designated cellar; wherein the liquor information includes at least a corresponding cellar number, a degree of alcohol of liquor produced by the cellar, a liquor flavor, a liquor production time, and a consumer tasting index ⟋S102 according to the volume of the mouthful packaged raw liquor and the liquor output amount of the designated cellar, obtaining the number of mouthful packaged raw liquors that can be canned ⟋S103 according to the number of the mouthful packaged raw liquor and the liquor information, obtaining identification pieces having the liquor information; wherein the digital identifier is configured for mobiles to scan and thereby connect to a cloud server of a distillery or supplier, and the number of the identification pieces is equal to that of the mouthful packaged raw liquor ⟋S104 dividing raw liquor of the designated cellar into a plurality of mouthful packaged raw liquors, arranging the identification pieces on the mouthful packaged raw liquors and sealing, thereby obtaining sealed mouthful packaged raw liquors ⟋S105 dividing the sealed mouthful packaged raw liquors into packaging boxes ⟋S106

FIG. 4

MOUTHFUL PACKAGED RAW LIQUOR AND ASSEMBLY, AND PERSONALIZED PRE-ORDERING METHOD BASED ON LIQUOR TASTING HABITS

CROSS REFERENCE TO RELATED APPLICATIONS

The present disclosure is a 35 U.S.C. 371 National Phase conversion of International (PCT) Patent Application No. PCT/CN2022/094944, filed on May 25, 2022, which claims priority of Chinese patent application No. CN202110817664.7 filed on Jul. 20, 2021. The entire contents of the above-identified applications are incorporated herein by reference. The PCT International Patent Application was filed and published in Chinese.

TECHNICAL FIELD

The present application relates to the technical field of liquor sets, and in particular to a mouthful packaged raw liquor, an assembly, and a personalized pre-ordering method based on liquor tasting habits.

BACKGROUND

With continuous development of society, people's life quality has been greatly improved. In festivals and activities such as various gatherings, the use rate of liquor becomes higher and higher, and people are constantly pursuing high-quality and flavorful raw liquor, which is becoming more and more popular. However, since there are a large number of cellars, flavors of raw liquor produced in the cellars are different.

In the prior art, in order to purchase flavorful raw liquor, it is necessary to purchase a large amount of raw liquor from different cellars for tasting, which increases time cost and purchase cost, and also causes waste when encountering raw liquor with poor flavor.

In the prior art, grades of liquors of distilleries are mainly evaluated by technical experts of distilleries, the grade evaluation completely deviates from preferences or tasting habits of ordinary consumers. As a result, flavor grades of liquors are often only related to prices and internal rating of distilleries, and the grades deviate from actual liquor tasting needs of consumers and liquor tasting culture. Not only are ordinary consumers deprived of opportunities of evaluating liquor grades based on their liquor tasting preferences, but also there is a problem that grade classification lacks consumption basis.

Raw liquors in the prior art usually use large bottles larger than 50 ml, 0.25 kilogram, or even 0.5 kilogram. Such liquors packaged in large bottles, in large drinking occasions such as gatherings, are often remained due to the liquor bottles being opened but unable to finish drinking, resulting in waste of liquors. The production process of liquor requires consuming a large amount of food, and our country has a large population, with high pressure on arable land and grain cultivation. Therefore, how to prevent waste of liquor and reduce loss of grain, while the demand for fine wine among the people will not be reduced, is a technical issue that needs to be addressed.

In the prior art, ordinary liquor bottles usually exist as a kind of solid waste object after use. Only some of the liquor bottles with such structures can be recycled, and most of them are discarded as waste. The reason is that the structural designs of the liquor bottles are unreasonable, which results in that the liquor bottles are unable to be reused as a household item in daily life.

Based on the shortcomings existing in the prior art, it is urgently required to research a mouthful packaged raw liquor, an assembly, and a personalized pre-ordering method based on liquor tasting habits to solve the above problems.

SUMMARY OF THE DISCLOSURE

According to embodiments of the present application, a mouthful packaged raw liquor is provided, which comprises a liquor bottle and raw liquor liquid packaged in the liquor bottle; an outer sidewall of the liquor bottle is provided with an identification piece and a covering piece; the identification piece has at least a cellar number identification, a cellar alcohol content identification, a flavor identification, and cellar grade information corresponding to the raw liquor liquid thereon; the covering piece covers on the identification piece, such that the identification piece is invisible, and the covering piece is removable from the liquor bottle; a volume of the liquor bottle is 10-50 ml; the raw liquor liquid is made by fermenting and distilling brewing raw materials in a specific cellar, without undergoing blending or mixing processes; the specific cellar is one of multiple brewing fermentation cellars with different taste or flavor levels.

Furthermore, the volume of the liquor bottle is 30-35 ml.

Furthermore, the identification piece is provided with a digital identifier for scanning and identification by a mobile terminal; the digital identifier is configured for a mobile terminal to scan and thereby connect to a cloud server of a distillery or supplier, and upload cellar information corresponding to the raw liquor liquid in the liquor bottle to the cloud server of the distillery or supplier, such that the cloud server of the distillery or supplier sends corresponding electronic gifts, electronic currencies, or prize information to the mobile terminal.

Furthermore, the liquor bottle is of a cup-shaped structure, an opening end of the liquor bottle is provided with a sealing cover, the sealing cover is detachably connected to the opening end of the liquor bottle, thereby forming a cavity configured to accommodate the raw liquor liquid and relatively sealed.

Another aspect of the present application protects a mouthful packaged raw liquor assembly, which comprises a packaging box and at least one aforementioned mouthful packaged raw liquor, the mouthful packaged raw liquor is placed in the packaging box.

Furthermore, multiple mouthful packaged raw liquors of different specified cellars are packaged in the same packaging box.

Furthermore, the packaging box is further provided therein with at least one standard reference liquor; the standard reference liquor cans therein with ordinary liquor liquid or standard national liquor liquid that has been blended and mixed by a distillery to achieve uniform flavor and alcohol content.

Furthermore, the standard reference liquor and the mouthful packaged raw liquor are arranged in pair.

Furthermore, liquor bottles of the standard reference liquor and of the mouthful packaged raw liquor are connected together, the liquor bottles are connected together by adhesion or integrated molding.

Furthermore, a volume of the packaging box is 90-150 cm$^3$.

Furthermore, the volume of the packaging box is 112 cm$^3$.

Furthermore, the packaging box is of a flip top cigarette box type, and comprises a box body that accommodates the mouthful packaged raw liquor, and the box body is provided with a top cover that can be flipped.

Another aspect of the present application protects a personalized pre-ordering method based on liquor tasting habits, which is used to pre-order the aforementioned mouthful packaged raw liquor assembly, the method comprises: receiving a pre-ordering request for a cellar with a designated flavor sent by a mobile terminal, wherein the pre-ordering request is sent by the mobile terminal after identifying a digital identifier by scanning to connect the mobile terminal with a cloud server network; sending an information input page to the mobile terminal according to the pre-ordering request; receiving a required amount and a cellar type sent by the mobile terminal, wherein the required amount and the cellar type are input through a client on the information input page; generating a matching request based on the required amount and the cellar type; generating pre-ordering information based on the matching request and forming a personalized package.

Furthermore, the forming a personalized package comprises the following steps: classifying and numbering cellars, wherein the classification strategy comprises: within a fixed time period, by a cloud server, performing dynamically grading for cellar levels based on the number of cellars with designated flavors ordered according to preferences and habits of ordinary consumers after tasting liquor, performing arrangement from high to low for dynamic cellar levels according to the ordered number of the cellars per unit time, and numbering the dynamic cellar levels to form consumer tasting indexes; obtaining liquor information of a designated cellar, a volume of a mouthful packaged raw liquor, and liquor output amount of a designated cellar; wherein the liquor information comprises at least a corresponding cellar number, a degree of alcohol of liquor produced by the cellar, a liquor flavor, a liquor production time, and a consumer tasting index; according to the volume of the mouthful packaged raw liquor and the liquor output amount of the designated cellar, obtaining the number of mouthful packaged raw liquors that can be canned; according to the number of the mouthful packaged raw liquor and the liquor information, obtaining identification pieces having the liquor information, wherein the number of the identification pieces is equal to that of the mouthful packaged raw liquor; dividing raw liquor of the designated cellar into a plurality of mouthful packaged raw liquors, arranging the identification pieces on the mouthful packaged raw liquors and sealing, thereby obtaining sealed mouthful packaged raw liquors; dividing the sealed mouthful packaged raw liquors into packaging boxes.

Details of one or more embodiments of the present application are presented in the following drawings and description. Other features, purposes, and advantages of the present application will become apparent from the specification, drawings, and claims.

BRIEF DESCRIPTION OF THE DRAWINGS

In order to explain technical solutions of the present application more clearly, drawings required to be used in description of the embodiments or of the prior art will be briefly introduced below. It is obvious that the drawings in the following description are only some embodiments of the present application. For one of ordinary skill in the art, other drawings can be further obtained according to these drawings on the premise of paying no creative work.

FIG. 3 is a flow chart of a personalized pre-ordering method based on liquor tasting habits according to an embodiment of the present application.

FIG. 4 is a flow chart of the step of forming a personalized package in the method shown in FIG. 3.

Figure 1:
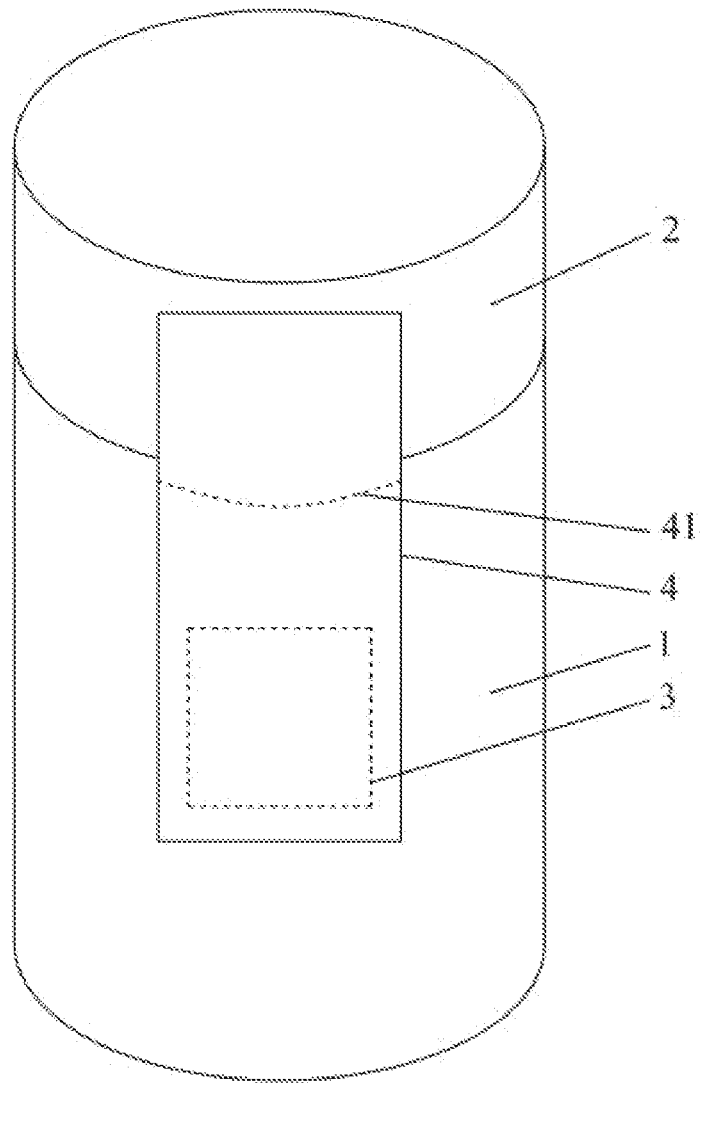
FIG. 1 is a structural view of a mouthful packaged raw liquor according to an this embodiment of the present application.

Among them, the figure reference numbers in the drawings are correspondingly: 1—liquor bottle; 2—sealing cover; 3—identification piece; 4—covering piece; 5—tearable opening structure.

DETAILED DESCRIPTION

The technical solutions in the embodiments of the present application will be described clearly and completely below in combination with the drawings in the embodiments of the present application. Obviously, the described embodiments are merely some embodiments of the present application, rather than all embodiments. Based on the embodiments of the present application, any other embodiment obtained by one of ordinary skill in the art on the premise of paying no creative work should belong to the protection scope of the present application.

It needs to be noted that the terms "first", "second", and the like in the specification, the claims, and the aforementioned drawings of the present application are used to distinguish similar objects, and need not be used to describe a specific sequence or order. It should be understood that data used in this way can be interchanged in appropriate cases, so that the embodiments of the present application described herein can be implemented in order other than those illustrated or described herein. In addition, the terms "include", "have", as well as any variations thereof, are intended to cover non-exclusive inclusion. For example, a process, method, system, product, or device that includes a series of steps or units need not be limited to those clearly listed steps or units, but may include other steps or units that are not clearly listed or inherent to these processes, methods, products, or devices.

The prior art has the following shortcoming: since there are a large number of cellars, flavors of raw liquor produced in the cellars are different; in the prior art, in order to purchase flavorful raw liquor, it is necessary to purchase a large amount of raw liquor from different cellars for tasting, which increases time cost and purchase cost, and also causes waste when encountering raw liquor with poor flavor.

Aiming the defect of the prior art, the present application provides a mouthful packaged raw liquor with a volume of 10-50 ml to package raw liquor that is neither blended nor mixed by distillery bartenders and is directly canned from cellars, such that drinkers can directly purchase the mouthful packaged liquor set to taste. Processes of purchasing raw liquor suitable for drinkers are accelerated, and there is no need to purchase a large amount of raw liquor from the same cellar, which to some extent avoids waste and can also reduce purchasing cost.

Embodiments

Figure 2:
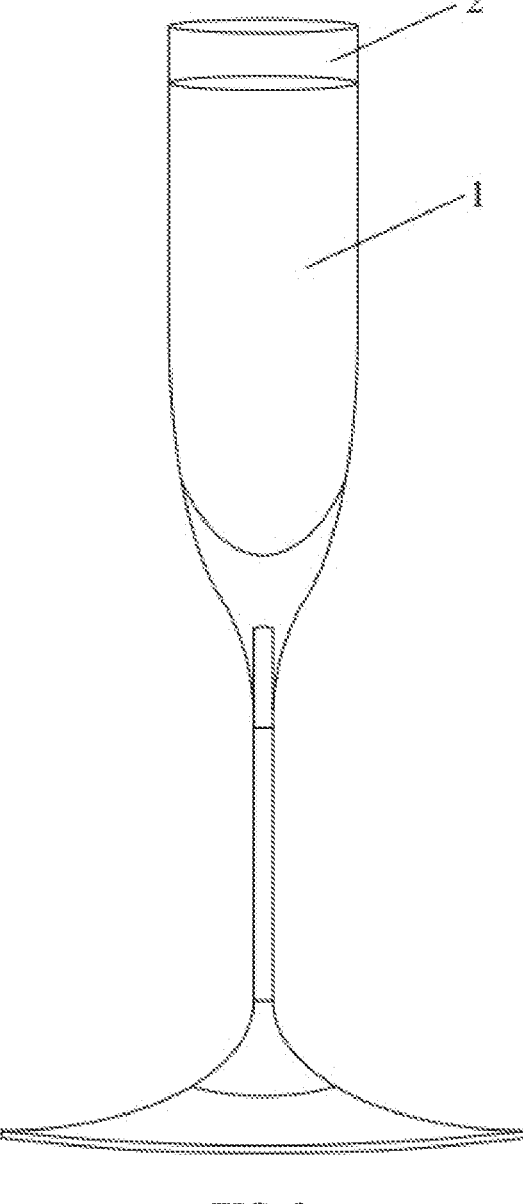
FIG. 2 is a structural view of a mouthful packaged raw liquor according to another embodiment of the present application.

Referring to FIG. 1-FIG. 4, this an embodiment of the present application provides a mouthful packaged raw liquor, which includes a liquor bottle 1 and raw liquor liquid packaged in the liquor bottle 1; an outer sidewall of the liquor bottle 1 is provided with an identification piece 3 and a covering piece 4; the identification piece 3 has at least a cellar number identification, a cellar alcohol content identification, a flavor identification, and cellar grade information corresponding to the raw liquor liquid thereon; the covering piece 4 covers on the identification piece 3, such that the identification piece 3 is invisible, and the covering piece 4 is removable from the liquor bottle 1; a volume of the liquor bottle 1 is 10-50 ml; the raw liquor liquid is made by fermenting and distilling brewing raw materials in a specific cellar, without undergoing blending or mixing processes; wherein the brewing raw materials are grain or other brewing subsidiary materials; the specific cellar is one of multiple brewing fermentation cellars with different taste or flavor levels.

It needs to be explained that the present application provides a mouthful packaged raw liquor with a volume of 10-50 ml to package raw liquor that is neither blended nor mixed by distillery bartenders and is directly canned from cellars, such that drinkers can directly purchase the mouthful packaged raw liquor to taste. Processes of purchasing raw liquor suitable for drinkers are accelerated, and there is no need to purchase a large amount of raw liquor from the same cellar, which to some extent avoids waste and can also reduce purchasing cost.

It also needs to be explained that in this embodiment, dynamic cellar grade numbers and consumer tasting indices are formed based on consumers' liquor tasting, and cellars with actually different flavor and taste grades are rated, such that consumers can directly book cellars with their own desired taste and flavor grades, and distilleries switch from selling liquor to selling cellars with different grades and flavors. In this embodiment, it is also possible to establish connection relation between distilleries and consumers through a cloud server by setting up the mouthful packaged raw liquor. Consumers can directly book distilleries' cellars with special flavors, personalized needs of different groups can be met. At the same time, distilleries can also expand specific cellars according to actual preferences of consumers, or adjust sales prices and quantities based on the consumer taste indices.

In some possible embodiments, the volume of the liquor bottle is 30-35 ml.

In some possible embodiments, the identification piece 3 is adhered on the outer sidewall of the liquor bottle 1, and the identification piece 3 is a paper label.

Specifically, the covering piece 4 can be torn or erased, such that the covering piece 4 on the identification piece 3 is removed, and drinkers are enabled to quickly see liquor information of the raw liquor.

In some possible embodiments, the covering piece 4 is adhered on the identification piece 3; the covering piece 4 covers the identification piece 3 completely, the identification piece 3 cannot be seen, such that drinkers do not know the flavor of the raw liquor, thereby forming a blind-box drinking style and increasing fun of drinking; the covering piece 4 is also a paper label.

Specifically, an adhesive force between the covering piece 4 and the identification piece 3 is less than an adhesive force between the identification piece 3 and the liquor bottle 1, such that the covering piece 4 can be torn off from the identification piece 3, while the identification piece 3 is still adhered on the liquor bottle 1.

Specifically, after the covering piece 4 is torn off from the identification piece 3, the covering piece 4 cannot be adhered to the identification piece 3 again, that is, the covering piece 4 cannot be reused. It can be avoided that the covering piece 4 is attached again after the raw liquor is blended. The covering piece 4 that cannot be reused can ensure that the raw liquor in the mouthful packaged raw liquor is not blended.

In some possible embodiments, the covering piece 4 includes a first covering part, a second covering part, and a tearable opening structure 41 formed by prefabricated cut dashed lines; the tearable opening structure 41 is arranged at the connection between the first covering part and the second covering part; the liquor bottle 1 is further provided with a sealing cover 2, the first covering part is adhered and fixed to the sealing cover 2, and the second covering part is adhered and fixed to the liquor bottle 1.

In some possible embodiments, the identification piece 3 is provided with a digital identifier for scanning and identification by mobile terminals. The digital identifier is used for a mobile terminal to scan and thereby connect to a cloud server of a distillery or supplier, and upload cellar information corresponding to the raw liquor liquid in the liquor bottle 1 to the cloud server of the distillery or supplier, such that the cloud server of the distillery or supplier sends corresponding electronic gifts, electronic currencies, or prize information to the mobile terminal.

In some possible embodiments, the outer sidewall of the liquor bottle 1 is provided with two identification pieces 3, wherein one identification piece 3 is covered by the covering piece 4, the other identification piece 3 is not covered by the covering piece 4, and the uncovered identification piece 3 is provided with a digital identifier for scanning and identification by mobile terminals.

In some possible embodiment, the liquor bottle 1 is of a cup-shaped structure, an opening end of the liquor bottle 1 is provided with the sealing cover 2, the sealing cover 2 is detachably connected to the opening end of the liquor bottle 1, thereby forming a cavity configured to accommodate the raw liquor liquid and be relatively sealed. The sealing cover 2 can be quickly removed from the opening end of the liquor bottle 1 to facilitate drinking.

Specifically, the sealing cover 2 is connected by thread to the opening end of the liquor bottle 1.

In some possible embodiments, the liquor bottle 1 is integrally formed with the sealing cover 2, the two form a structure similar to an ampoule bottle, such that the sealing cover 2 cannot be sealed and connected with the liquor bottle 1 again after the sealing cover 2 is separated from the liquor bottle 1. It is avoided that the raw liquor in the liquor bottle 1 is blended and the flavor of the raw liquor is affected.

Another aspect of the present application protects a mouthful packaged raw liquor assembly, which comprises a packaging box and at least one aforementioned mouthful packaged raw liquor, the mouthful packaged raw liquor is placed in the packaging box.

In some possible embodiments, the packaging box includes a plurality of accommodation grooves; each of the accommodation grooves can be provided therein with a mouthful packaged raw liquor, and the plurality of mouthful packaged raw liquor in the packaging box can come from different cellars, such that a drinker can drink raw liquors of multiple cellars, and it is easy to find raw liquors suitable for the drinker's preference.

Specifically, the packaging box accommodates mouthful packaged raw liquor from the same cellar, or the packaging box accommodates mouthful packaged raw liquor from different cellars.

In some possible embodiments, multiple mouthful packaged raw liquors of different specified cellars are packaged in the same packaging box.

In some possible embodiments, the packaging box is further provided therein with at least one standard reference liquor; the standard reference liquor cans therein with ordinary liquor liquid or standard national liquor liquid that has been blended and mixed by a distillery to achieve uniform flavor and alcohol content.

In some possible embodiments, the standard reference liquor and the mouthful packaged raw liquor are arranged in pair for convenience for consumers to compare and taste liquor.

In some possible embodiments, liquor bottles of the standard reference liquor and of the mouthful packaged raw liquor are connected together, the liquor bottles are connected together by adhesion or integrated molding, as a special structure and sales method of liquor.

In some possible embodiments, a volume of the packaging box is 90-150 cm³.

In some possible embodiments, the volume of the packaging box is 112 cm³.

In some possible embodiments, the packaging box is of a flip top cigarette box type, and includes a box body that accommodates the mouthful packaged raw liquor, and the box body is provided with a top cover that can be flipped.

Another aspect of the present application protects a personalized pre-ordering method based on liquor tasting habits, which is used to pre-order the aforementioned mouthful packaged raw liquor assembly, the method includes: S201: receiving a pre-ordering request for a cellar with a designated flavor sent by a mobile terminal, wherein the pre-ordering request is sent by the mobile terminal after identifying a digital identifier by scanning to connect the mobile terminal with a cloud server network; S202, sending an information input page to the mobile terminal according to the pre-ordering request; S023, receiving a required amount and a cellar type sent by the mobile terminal, wherein the required amount and the cellar type are input through a client on the information input page; S204, generating a matching request based on the required amount and the cellar type; S205, generating pre-ordering information based on the matching request and forming a personalized package.

In some possible embodiments, after the receiving a required amount and a cellar type sent by the mobile terminal, wherein the required amount and the cellar type are input through a client on the information input page, the method further includes: receiving cellar information input by the mobile terminal on the information input page; sending electronic gifts, electronic currencies, or prize information corresponding to the cellar information.

Specifically, the mobile terminal can acquire electronic gifts, electronic currencies, prize information, and so on sent by a distillery client or a cloud server.

In some possible embodiments, after the sending an information input page to the mobile terminal according to the pre-ordering request, the method further includes: receiving cellar evaluation information input by the mobile terminal on the information input page; grading or optimizing the grading of cellars based on the cellar evaluation information and the required amount; sorting according to the levels of the cellars to obtain cellar level ranking.

In some possible embodiments, after the sending an information input page to the mobile terminal according to the pre-ordering request, the method further includes: acquiring evaluation results of different mobile terminals, sorting levels of cellars according to the evaluation results to obtain preset cellar level ranking; acquiring the required amount sent from the mobile terminal, and optimizing the preset cellar level ranking according to the required amount to obtain cellar level ranking.

In some possible embodiments, the forming a personalized package includes the following steps: S101, classifying and numbering cellars, wherein the classification strategy includes: within a fixed time period, by a cloud server, performing dynamically grading for cellar levels based on the number of cellars with designated flavors ordered according to preferences and habits of ordinary consumers after tasting liquor, performing arrangement from high to low for dynamic cellar levels according to the ordered number of the cellars per unit time, and numbering the dynamic cellar levels to form consumer tasting indexes; S102, obtaining liquor information of a designated cellar, a volume of a mouthful packaged raw liquor, and liquor output amount of a designated cellar; wherein the liquor information includes at least a corresponding cellar number, a degree of alcohol of liquor produced by the cellar, a liquor flavor, a liquor production time, and a consumer tasting index; S103, according to the volume of the mouthful packaged raw liquor and the liquor output amount of the designated cellar, obtaining the number of mouthful packaged raw liquors that can be canned; S104, according to the number of the mouthful packaged raw liquor and the liquor information, obtaining identification pieces 3 having the liquor information; wherein the digital identifier is configured for mobiles to scan and thereby connect to a cloud server of a distillery or supplier, and the number of the identification pieces 3 is equal to that of the mouthful packaged raw liquor; S105, dividing raw liquor of the designated cellar into a plurality of mouthful packaged raw liquors, arranging the identification pieces 3 on the mouthful packaged raw liquors and sealing, thereby obtaining sealed mouthful packaged raw liquors; S106, dividing the sealed mouthful packaged raw liquors into packaging boxes.

Specifically, each mouthful packaged raw liquor is provided with an identification piece 3 corresponding thereto.

In some possible embodiments, the according to the volume of the mouthful packaged raw liquor and the liquor output amount of the designated cellar, obtaining the number of mouthful packaged raw liquor that can be canned includes: dividing the liquor output amount of the designated cellar by the volume of the mouthful packaged raw liquor, the obtained integer is the number of mouthful packaged raw liquor that can be canned.

In some possible embodiments, after the dividing the sealed mouthful packaged raw liquor into packaging boxes, the method further includes: obtaining the number of the mouthful packaged raw liquor of the designated cellar that can be canned and the number of the mouthful packaged raw liquor accommodated in one packaging box; dividing the number of the mouthful packaged raw liquor of the designated cellar that can be canned by the number of the mouthful packaged raw liquor accommodated in one packaging box to obtain the number of required packaging boxes.

Although the present application has been described through preferred embodiments, the present application is not limited to the embodiments described herein and further includes various changes and variations made without departing from the scope of the present application.

In this specification, the involved positional terms, such as "front", "back", "up", "down", and the like are defined according to positions of components located in the figures and among the components in the accompany drawings, and are only for clarity and convenience of expressing technical solutions. It should be understood that the use of the positional terms should not limit the scope of protection requested in the present application.

In this specification, the above embodiments and features in the embodiments can be combined with each other in the situation of no conflict.

The above disclosure is only a preferred embodiment of the present application, and of course, it cannot be used to limit the scope of right of the present application. Therefore, equivalent changes made according to the claims of the present application still fall within the scope covered by the present application.

What is claimed is:

1. A packaged serving of liquor comprising a liquor bottle and raw liquor liquid packaged in the liquor bottle;

wherein an outer sidewall of the liquor bottle is provided with an identification piece and a covering piece; the identification piece has at least a cellar number identification, a cellar alcohol content identification, a flavor identification, and cellar grade information corresponding to the raw liquor liquid therein; the covering piece covers the identification piece, such that the identification piece is hidden under the covering piece, and the covering piece is removable from the liquor bottle; a volume of the liquor bottle is 10-50 ml; the raw liquor liquid is made by fermenting and distilling brewing raw materials in a fermentation cellar, without undergoing blending or mixing processes;

wherein the covering piece comprises a first covering part, a second covering part, and a tearable opening structure arranged at a connection portion between the first covering part and the second covering part, the first covering part is fixed to an opening end of the liquor bottle, and the second covering part is fixed to a main body of the liquor bottle.

2. The packaged serving of liquor according to claim 1, wherein the volume of the liquor bottle is 30-35 ml.

3. The packaged serving of liquor according to claim 1, wherein the identification piece is provided with a digital identifier for scanning and identification by a mobile terminal; the digital identifier is configured for a mobile terminal to scan and thereby connect to a cloud server of a distillery or supplier, and upload cellar information corresponding to the raw liquor liquid in the liquor bottle to the cloud server of the distillery or supplier, such that the cloud server of the distillery or supplier sends corresponding electronic gifts, electronic currencies, or prize information to the mobile terminal.

4. The packaged serving of liquor according to claim 1, wherein the liquor bottle is of a cup-shaped structure, the opening end of the liquor bottle is provided with a sealing cover, the sealing cover is detachably connected to the opening end of the liquor bottle, thereby forming a cavity configured to accommodate the raw liquor liquid and relatively sealed.

5. The packaged serving of liquor according to claim 1, wherein the tearable opening structure is formed by prefabricated cut dashed lines.

6. A single-serving raw liquor assembly comprising a packaging box and at least one packaged serving of liquor, wherein the packaged serving of liquor is placed in the packaging box;

the packaged serving of liquor comprises a liquor bottle and raw liquor liquid packaged in the liquor bottle;

an outer sidewall of the liquor bottle is provided with an identification piece and a covering piece; the identification piece has at least a cellar number identification, a cellar alcohol content identification, a flavor identification, and cellar grade information corresponding to the raw liquor liquid therein; the covering piece covers the identification piece, such that the identification piece is hidden under the covering piece, and the covering piece is removable from the liquor bottle, the raw liquor liquid is made by fermenting and distilling brewing raw materials in a fermentation cellar, without undergoing blending or mixing processes;

the covering piece comprises a first covering part, a second covering part, and a tearable opening structure arranged at a connection portion between the first covering part and the second covering part, the first covering part is fixed to an opening end of the liquor bottle, and the second covering part is fixed to a main body of the liquor bottle.

7. The single-serving raw liquor assembly according to claim 6, wherein multiple packaged serving of liquors of different taste or flavor levels from different fermentation cellars are packaged in the same packaging box.

8. The single-serving raw liquor assembly according to claim 6, wherein the packaging box is further provided therein with at least one standard reference liquor; the standard reference liquor is filled with a liquor liquid with standardized flavor and alcohol content, which serves as a control for comparing a flavor characteristics of the raw liquor liquid, or a reference liquor liquid that has been blended and adjusted to achieve a predetermined, uniform flavor and alcohol content.

9. The single-serving raw liquor assembly according to claim 8, wherein the standard reference liquor and the packaged serving of liquor are arranged in pair.

10. The single-serving raw liquor assembly according to claim 8, wherein liquor bottles of the standard reference liquor and of the packaged serving of liquor are connected together, the liquor bottles are connected together by adhesion or integrated molding.

11. The single-serving raw liquor assembly according to claim 5, wherein, a volume of the packaging box is 90-150 $cm^3$.

12. The single-serving raw liquor assembly according to claim 10, wherein the volume of the packaging box is 112 $cm^3$.

13. The single-serving raw liquor assembly according to claim 6, wherein the packaging box is of a flip top cigarette box type, and comprises a box body that accommodates the mouthful packaged raw liquor, and the box body is provided with a top cover that can be flipped.

14. A personalized pre-ordering method for a single-serving raw liquor assembly according to claim 6, and comprises:

receiving, from a mobile terminal, an ordering request for a fermentation cellar with designated flavor, which is sent after the mobile terminal scans and recognizes a digital identifier and establishes a connection with a cloud server;

sending an information input requirement to the mobile terminal in response to the ordering request;

receiving, from the mobile terminal, an ordered quantity of liquor and a selected fermentation cellar instruction, which are input through an information input interface of the mobile terminal;

generating a liquor-source matching instruction based on the ordered quantity of liquor and the selected fermentation cellar instruction;

generating an ordering information and a customized packaging plan based on the liquor-source matching instruction.

15. The personalized pre-ordering method for the single-serving raw liquor assembly according to claim 14, wherein generating the customized packaging plan comprises:

calculating a consumer preference score for each of a plurality of fermentation cellars, based on a total of the ordered quantity of liquor of the fermentation cellars within a predetermined time period;

dynamically ranking the fermentation cellars from high to low based on the consumer preference scores;

assigning a consumer tasting index to each ranked fermentation cellar;

obtaining a liquor information, a volume of the packaged serving of liquor, and an available volume of raw liquor of a designated fermentation cellar; wherein the liquor information comprises at least one of a fermentation cellar number, an alcohol degree of liquor produced from the fermentation cellar, a liquor flavor, a liquor production time, and the consumer tasting index;

calculating the available number of the packaged serving of liquor that can be obtained from the designated fermentation cellar;

obtaining identification pieces with the liquor information according to the available number of the packaged serving of liquor and the liquor information;

bottling the raw liquor of the designated fermentation cellar into a plurality of packaged serving of liquors and affixing the identification pieces on the packaged serving of liquor;

packaging the sealed packaged serving of liquor into packaging boxes.

16. The single-serving raw liquor assembly according to claim 6, wherein the tearable opening structure is formed by prefabricated cut dashed lines.

17. The single-serving raw liquor assembly according to claim 6, wherein a volume of the liquor bottle is 10-50 ml.

18. The single-serving raw liquor assembly according to claim 6, wherein the raw liquor liquid is made by fermenting and distilling brewing raw materials in a specific fermentation cellar, without undergoing blending or mixing processes; the specific fermentation cellar is one of multiple brewing fermentation cellars with different taste or flavor levels.

19. The single-serving raw liquor assembly according to claim 6, wherein the opening end of the liquor bottle is provided with a sealing cover, the sealing cover is detachably connected to the opening end of the liquor bottle.

* * * * *